United States Patent [19]

Brancato et al.

[11] 3,928,272
[45] Dec. 23, 1975

[54] PROCESS OF MAKING UREA-FORMALDEHYDE SOLID MICROSPHERES

[75] Inventors: Jack J. Brancato, Lincroft; Daniel F. Herman, Princeton, both of N.J.

[73] Assignee: N L Industries, Inc., New York, N.Y.

[22] Filed: Mar. 25, 1974

[21] Appl. No.: 454,594

[52] U.S. Cl............. 260/29.4 R; 162/166; 260/851
[51] Int. Cl............................................. C08g 51/24
[58] Field of Search.......... 260/2.5 B, 2.5 F, 29.4 R

[56] References Cited
UNITED STATES PATENTS

| | | | |
|---|---|---|---|
| 3,418,656 | 12/1968 | Vassiliades et al. | 260/2.5 F |
| 3,516,941 | 6/1970 | Matson | 260/2.5 F |
| 3,585,149 | 6/1971 | Vassiliades et al. | 260/2.5 F |
| 3,669,899 | 6/1972 | Vassiliades et al. | 260/2.5 F |
| 3,707,514 | 12/1972 | Vassiliades et al. | 260/2.5 F |
| 3,779,941 | 12/1973 | Vassiliades et al. | 260/2.5 F |
| 3,779,957 | 12/1973 | Vassiliades et al. | 260/2.5 F |
| 3,781,230 | 12/1973 | Vassiliades et al. | 260/2.5 F |

*Primary Examiner*—Morton Foelak

[57] ABSTRACT

Spheroidal shaped microspheres of urea-formaldehyde have been prepared. These microspheres are regular in shape and have an average diameter which falls within the range of from 0.2 to 4 $\mu$. The surface area of these microspheres are from 10 to 90 $m^2/gm$. When used as a filler in paper at a 6% loading in a No. 35/ream paper, the opacity is at least 82%.

These spheroidal shaped microspheres of urea-formaldehyde are also readily dispersible in coating vehicles, paper coating compositions, latex paint formulations and solvent based polyester film-forming compositions.

These microspheres are prepared by forming a water-in-oil emulsion in which the urea-formaldehyde prepolymer is dissolved in the water phase. The urea-formaldehyde is then polymerized to form the microspheres of the size mentioned above.

4 Claims, No Drawings

PROCESS OF MAKING UREA-FORMALDEHYDE SOLID MICROSPHERES

BACKGROUND OF THE INVENTION

The prior art has disclosed the preparation of clusters of urea-formaldehyde microparticles which have high surface areas and are useful in water based products such as in pigmentary and opacifying fillers and coatings in paper manufacturing. These prior art clusters of urea-formaldehyde microparticles, however, are irregular in shape. The surface area of such clusters are from 10 $m^2$/gm. to 250 $m^2$/gm. Although these high surface area clusters of urea-formaldehyde particles are useful for paper purposes, they readily agglomerate with other clusters and, therefore, give lower opacity results when used in paper formulations. These prior art products usually are prepared by catalyzing the prepolymers dissolved in water to form gels which are then dried and milled. These prior art procedures provide little or no control over the particle size of the final microspheres as opposed to the instant process which provides control over the size of the product through the device of forming water droplets in which the prepolymer is dissolved and the size of the microspheres produced, i.e., from 0.2 to 4.0 microns, is dependent upon the size of the water droplets present in the emulsion.

SUMMARY OF THE INVENTION

Spheroidal shaped microspheres of urea-formaldehyde have been prepared. These microspheres are regular in shape and have an average surface area of from 10 to 90 $m^2$/gm. These microspheres have a diameter range of from .2 $\mu$ to 4 $\mu$.

These particles are prepared by admixing with high shear an aqueous solution of urea-formaldehyde prepolymer with a non-solvent containing an emulsifying agent. The temperature at mixing should be held from 15°C to 40°C. A water-in-oil emulsion is formed and the urea-formaldehyde prepolymer is dissolved in the water phase.

While maintaining the emulsion at a temperature between 15°C and 40°C, an acid catalyst is added to the emulsion to adjust the pH to fall within the range of from 2 to 5 during which time the prepolymer, dissolved in the water phase polymerizes and forms spheroidal shaped particles suspended in the emulsion.

The suspension is allowed to age for at least one hour and after aging the suspension is diluted with water and a dispersant is added to prevent agglomeration of the suspended particles. The diluted slurry is then neutralized to pH of 6.5 – 7.5. The particles are then separated from the non-solvent phase by centrifuging, vacuum stripping or by filtering and washing.

After drying, the polymerized urea-formaldehyde particles are spheroidal and regular in shape and have a diameter of 0.2 – 4.0 $\mu$.

These spheroidal shaped particles of urea-formaldehyde disperse readily in paper furnishes and paper coating formulations, in latex vehicles and organic coating compositions.

DESCRIPTION OF THE PREFERRED EMBODIMENTS

In carrying out the process of the instant invention an urea-formaldehyde prepolymer is selected in which for each mole of urea there are present from 0.8 to 2 moles of formaldehyde. A water solution of this urea-formaldehyde prepolymer is prepared which contains from 20% to 50% solids by weight.

This solution is admixed with high shear to a non-solvent to form a water-in-oil emulsion. The amount of the non-solvent used is from ¼ to 4 parts by weight for each part of water, preferably below 1.

The water forms droplets suspended in the non-solvent and the prepolymer is dissolved in the water phase. It has been found, however, that if the amount of non-solvent used is less than 1 part for each part of water, that a minor portion (i.e. up to 20%) of the water remains as irregular shaped regions distributed throughout the non-solvent in addition to the water droplets. The urea-formaldehyde prepolymer dissolved in the water phase is polymerized to form spheroidal shaped particles of size from 0.2 to 4 microns.

The non-solvent employed preferably should be an aromatic hydrocarbon. Among those which are particularly effective are xylene, toluene and benzene.

It has been found that it is necessary to have present in the non-solvent an emulsifying agent which will stabilize the water-in-oil emulsion. The emulsifying agents employed should be either the graft polymers of the type described in U.S. Pat. No. 3,244,772 or a sorbitol ester of long chain fatty acids having an HLB between 4.3 and 8.6.

The amount of emulsifying agent employed in the non-solvent is from 2% to 6% of the weight of the non-solvent.

To form the emulsion, the urea-formaldehyde solution preferably is added dropwise and under high shear to the non-solvent containing the emulsifying agent. This mixing should take place at 15°C to 40°C. If higher temperatures are employed, coalescence occurs and the water droplets formed are significantly larger (i.e. up to 15 microns). Higher temperature also may induce premature polymerization which is undesirable.

In order to polymerize the urea-formaldehyde, an acid catalyst is then added slowly to the emulsion. The catalyst employed may be an acid having an ionization constant of from 0.005 to 20. Catalysts which are particularly effective are para-toluene sulfonic acid (dissolved in isopropyl alcohol or water) or tartaric acid. The amount of catalyst employed is from 0.5% to 2% of the weight of the urea-formaldehyde. This amount of catalyst will lower the pH to a range from 2 to 5.

The emulsion is then diluted with water in an amount approximately equal to half the amount of water originally employed in the prepolymer. The emulsion is then aged for at least one hour to promote the polymerization which forms the urea-formaldehyde particles. The diluted water allows the solution to maintain fluidity during the curing period.

A dispersant is added to prevent the particles from agglomerating either during or after diluting to prevent the particles from clustering. This dispersion therefore reduces the viscosity. Substantially, any well known dispersing agents may be employed. Among the dispersing agents which are effective are potassium tripolyphosphate (KTPP), sodium hexametaphosphate, sodium lauryl sulfate, and other dispersing agents of the type used for paint pigments.

The pH of the suspension is then adjusted to 6.5 – 7.5 with an alkaline agent such as $NH_4OH$. The product is then separated from the mixture by either vacuum stirring, centrifuging or filtering. The separated product is then dried under vacuum to remove the residual non-solvent and water.

These polymerized urea-formaldehyde spheroidal and regularly shaped particles have a size range from 0.2 $\mu$ to 4.0 $\mu$ and a surface area from 10 to 90 m$^2$/gm. These particles are particularly useful as opacifying agents in paper furnishes and paper coating formulations, in latex vehicles and organic coating compositions.

In order to describe the instant invention more fully, the following examples are presented:

EXAMPLE 1

5.0 gm. of a sorbitol ester of a high molecular weight fatty acid having an HLB of 4.7 were dissolve in 82.5 gm. xylene at 20°C.

329 gm. of a 30% solution of urea-formaldehyde prepolymer was prepared. The prepolymer had an urea to formaldehyde mole ratio of 1 to 1.5. The solution was added slowly to the xylene solution in a one gallon blender at high speed to form an emulsion. The temperature was held at 20°C by means of a cooling coil. Emulsification was continued until very small spherical water droplets were obtained. This occurred within ½ hr. after the complete addition of the urea-formaldehyde solution, thus forming a water-in-oil emulsion. The emulsion was catalyzed by slowly adding 1.44 gm. of para-toluenesulfonic acid dissolved in 10 cc isopropanol and the emulsion was aged overnight to cure the polymer.

After 24 hours aging, the polymerized product was diluted with 100 cc of water and dispersed with 1.6 gm. of potassium triphosphate and 0.27 gm. of a sodium salt of polymeric carboxylic acid which also raised the pH to 7.0. The neutralized product was then centrifuged and dried at 35° – 40°C under vacuum. A white product resulted which consisted of discrete regular spheroidal shaped particles averaging 1 $\mu$ in size with a size range from 0.2 to 4.0 $\mu$.

This urea-formaldehyde microsphere product was used as a paper filler in the following formulation: 450 gms. of wood pulp with a Williams freeness of 300 sec. were defiberized in 22 l. of water and treated with 9 gms. of dry resin and 15 gms. of aluminum sulfate. To 225 cc of this mixture were added 0.5 gms. of the urea-formaldehyde microsphere product and 1 cc of 0.1% a cationic retention aid. This produced a 4.55 gm. hand sheet with a 10% pigment loading in a 35 lb. ream. The hand sheet had a 85.6% black-white opacity.

EXAMPLES 2 – 3

In these runs the procedure of Example 1 was repeated except that the ratio of urea to formaldehyde was increased from 1:1.5 to 1:1 and the amount of catalyst was reduced from 1.44% to 0.72%. Also in Example 3 toluene was substituted for xylene. Similar results were obtained to those produced in Example 1.

The operational details and results obtained are recorded in the following table along with those of Example 1.

EXAMPLE 4

Using substantially the same procedure as that described in Example 1, this run was prepared using 20% instead of 30% urea-formaldehyde in the water phase. A sorbitol ester emulsifier having an HLB of 8.6 instead of 4.7 was employed and tartaric acid rather than para-toluene sulfonic acid was used. Sodium hexametaphosphate instead of potassium triphosphate was used as the dispersant.

Again, similar results were obtained and they are recorded in the table.

EXAMPLE 5

In this example the non-solvent to water ratio was increased from 0.36 to 2.25, a polyethylene oxide-ethyl acrylate graft polymer (ethyl acrylate grafted onto half the quantity by weight of polyethylene oxide (MW1500) rather than a sorbitol ester emulsifier was used; the amount of emulsifier was decreased from 5.7% to 3.3%; the temperature during emulsification was increased to 30°– 35°C rather than room temperature; the amount of catalyst was decreased from 1.44% to .7%; and sodium lauryl sulfate rather than KTPP was used as a dispersant.

EXAMPLE 6

The procedure of Example 5 was substantially repeated in this example except the amount of urea-formaldehyde in the water phase was increased from 33% to 50%; the non-solvent to water ratio was increased from 2.25 to 3.39; the amount of emulsifier was increased from 3.3% to 4.3%; and KTPP rather than sodium laruyl sulfate was used as a dispersant.

The details are also recorded in the table.

From the above description and by the examples presented, it has clearly been shown that spheroidal shaped microspheres of urea-formaldehyde have been produced which are regular in size and shape and are useful as an opacifying agent in various vehicles, particularly as an opacifier in paper.

While this invention has been described and illustrated by the examples shown, it is not intended to be strictly limited thereto, and other variations and modifications may be employed within the scope of the following claims.

TABLE

|  | Example 1 | Example 2 | Example 3 | Example 4 | Example 5 | Example 6 |
|---|---|---|---|---|---|---|
| NON-SOLVENT | Xylene | Xylene | Toluene | Xylene | Xylene | Xylene |
| UREA-FORMALDEHYDE (MOLE RATIO) | 1:1.5 | 1:1 | 1:1 | 1:15 | — | — |
| % U-F IN SOLVENT PHASE | 30 | 30 | 30 | 20 | 33 | 50 |
| NON-SOLVENT/SOLVENT (WT. RATIO) | .36 | .36 | .36 | .36 | 2.25 | 3.39 |
| EMULSIFIER | Sorbitol Ester | Sorbitol Ester | Sorbitol Ester | Sorbitol Ester | PE-EA Graft Poly. | PE-EA Graft Poly. |
| HLB OF EMULSIFIER | 4.7 | 4.7 | 4.7 | 8.6 | — | — |
| % EMULSIFIER (BASED ON NON-SOLVENT) | 5.7 | 5.7 | 5.7 | 5.7 | 3.3 | 4.3 |
| TIME OF ADDITION (MIN.) | 20 | 20 | 10 | 20 | 30 | 30 |
| TEMP. DURING EMULSIFICATION (°C) | room | room | room | room | 30–35 | 30–40 |
| CATALYST | Para-Toluene Sulfonic Acid | Para-Tol. Sulf.Acid | Para-Tol. Sulf.Acid | Tartaric Acid | Para-Tol. Sulf.Acid | Para-Toluene Sulf.Acid |
| % CATALYST BASED ON U-F | 1.44 | .72 | .72 | 1.44 | .7 | .8 |
| pH | 2.1 | 2.2 | 2.2 | 2.8 | — | — |

TABLE-continued

| | Example 1 | Example 2 | Example 3 | Example 4 | Example 5 | Example 6 |
|---|---|---|---|---|---|---|
| AMT. OF DILUTION $H_2O$ (GMS) | 100 | 100 | 100 | 100 | 460 | — |
| DISPERSANT | KTPP | KTPP | KTPP | Na Hexa-meta-phosphate | Na Lauryl Sulfate | KTPP |
| NEUTRALIZING AGENT | — | — | — | — | Ammonium Hydroxide | — |
| SEPARATION | Vacuum Distillation | Vacuum Distillation | Filtered | Filtered | Centrifuge | Flash Distillation |
| SIZE RANGE ($\mu$) | .2 to 4 | .5–3 | — | — | .7–1.5 | 0.25–0.88 |
| SURFACE AREA (gms./m²) | — | 39.9 | — | — | 12.5 | — |
| OPACITY (%) IN PAPER | 85.6 | 84.6 | 83.33 | similar results obtained | 85 | similar results obtained |

We claim:

1. Preparation of spheroidal solid shaped microspheres of urea-formaldehyde, said microspheres having a surface area of from 10 to 90 m²/gm. and having a diameter range from 0.2 $\mu$ to 4.0 $\mu$, which comprises admixing with high shear at a temperature from 15°C. to 40°C. an aqueous solution of urea-formaldehyde prepolymer and a non-solvent containing an emulsifying agent to form water droplets in a water-in-oil emulsion, said emulsifying agent selected from the group consisting of the polymer of ethyl acrylate grafted onto polyethylene oxide and the sorbitol ester of long chain fatty acids having an HLB between 4.3 and 8.6, said urea-formaldehyde prepolymer dissolved in the water droplets, adding an acid catalyst to the emulsion to adjust the pH to fall within the range of from 2 to 5 during which time the prepolymer dissolved in the water droplets polymerizes and forms spherical shaped particles of urea-formaldehyde, aging the suspension for at least one hour, diluting the suspension with water, adding a dispersing agent, said dispersing agent selected from the group consisting of pigment dispersing agents, potassium tripolyphosphate, sodium hexametaphosphate and sodium lauryl sulfate, and then the neutralizing the diluted dispersed slurry to pH of 6.5 – 7.5, separating the spherical particles from the solvent and non-solvent and drying the particles.

2. Process according to claim 1 in which the amount of non-solvent used is from ¼ to 4 parts by weight for each part of water.

3. Process according to claim 1 in which the non-solvent is an aromatic hydrocarbon selected from the group consisting of xylene, toluene and benzene.

4. Process according to claim 1 in which the emulsifying agent is present in the non-solvent in amount from 2% to 6% by weight of the non-solvent.

* * * * *